(No Model.)

M. P. BOSS.
AMALGAMATING PAN.

No. 325,387. Patented Sept. 1, 1885.

Witnesses,
Geo. H. Strong.
J. H. Towne.

Inventor,
M. P. Boss.
By Dewey & Co.
Attorneys

N. PETERS, Photo-Lithographer, Washington, D. C.

UNITED STATES PATENT OFFICE.

MARTIN P. BOSS, OF OAKLAND, CALIFORNIA.

AMALGAMATING-PAN.

SPECIFICATION forming part of Letters Patent No. 325,387, dated September 1, 1885.

Application filed June 29, 1885. (No model.)

*To all whom it may concern:*

Be it known that I, MARTIN P. BOSS, of the city of Oakland, Alameda county, State of California, have invented an Improvement in Amalgamating-Pans; and I hereby declare the following to be a full, clear, and exact description of the same.

My invention relates to the class of amalgamating-pans, and my invention consists in a steam chamber or space for the base and cone of the pan, and in the peculiarity of its construction, and of the bottom of the pan, as I shall hereinafter fully explain.

The object of my invention is to provide the greatest possible heating-surface.

Figure 1:
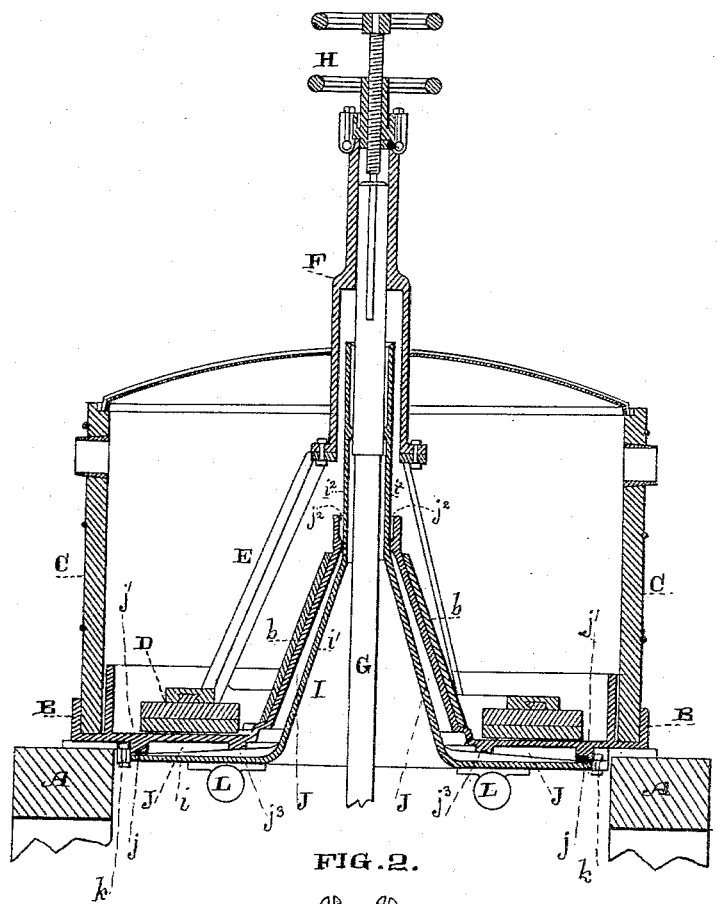
Figure 2:
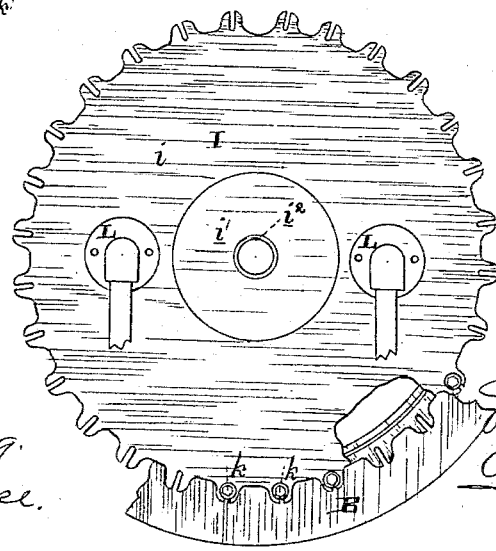

Referring to the accompanying drawings, Figure 1 is a vertical section of my pan. Fig. 2 is a bottom view, a section only of the outer portion of the pan being shown.

A are the bed-timbers, and B is the pan supported thereon, and having the cone center $b$. C are the sides; D, the mullers; E, the arms of the mullers; F, the rotating head to which the arms are secured; G, the shaft for driving the head, and H the adjusting-screws. These are all parts common to this class of pan.

In order to provide a steam-chamber or space of as great an extent as possible to obtain a large heating-surface, I have the plate, piece, or casting I, which is formed with an annular plane surface, $i$, a cone center, $i'$, and a tubular extension, $i^2$. This is fitted to the under side of the pan, as shown in Fig. 1, its cone extending upwardly within the cone $b$ of the pan and its tubular extension projecting through and beyond said cone into the head F and forming the bearing for the shaft G. A space, J, is left between the piece I and the bottom and cone of the pan, forming the steam-chamber, a packing being placed at $j$ in an annular rib, $j'$, under the pan, and a rust or other steam-tight joint being formed at $j^2$, between the top of the cone $b$ and the base of the tubular extension $i^2$. The piece I is tightened to its seat by screws $k$. L L are the steam-ports communicating with the chamber J. It will thus be seen that both the bottom and the cone of the pan are adapted to be heated, and that the construction is simple, practical, and durable.

I am aware that steam chambers have been heretofore provided for the bottom of the pan, and also for the cone, separately, but as far as I know a continuous steam-chamber in a single pan for both bottom and cone has never been used.

In addition to forming the seat for the packing, the rib $j'$, in connection with an inner and concentric rib, $j^3$, on the bottom of the pan, serves another purpose. When the shoes and dies are not fitted accurately in the same vertical plane, it is not unusual for the edges of the former to be worn into a point and those of the latter to be beveled or rounded down. This brings the shoes into contact with the bottom of the pan, which, being of much softer iron, soon wears through; but by having these ribs at this point of wear the pan cannot be worn through.

Having thus described my invention, what I claim as new, and desire to secure by Letters Patent, is—

1. In an amalgamating-pan, a continuous steam chamber or space under the bottom of the pan, and behind or within its cone center, substantially as herein described.

2. In an amalgamating-pan, the combination of the pan B, having a cone center, $b$, with the piece, plate, or casting I, having a cone center, $i'$, said piece, plate, or casting being so fitted and secured to the pan as to leave a chamber or space, J, under the bottom of the pan and behind or within the cone center $b$, substantially as herein described.

3. In an amalgamating-pan, the pan B, having a cone center, $b$, and an annular rib or flange, $j'$, on its bottom, in combination with the piece, plate, or casting I, having a cone center, $i'$, and fitted under the pan against the rib or flange $j'$ with suitable packing, its cone center fitting up within cone $b$ of the pan and united with the top of said cone by a steam-tight joint, whereby a steam-chamber, J, is formed under the pan and behind or within its cone, substantially as herein described.

4. In an amalgamating-pan, the combination of the pan B, having cone center $b$, with the piece, plate, or casting I, having an annular portion or rim, $i$, a cone center, $i'$, and tubular extension $i^2$, said piece, plate, or casting being so fitted and secured to the pan as to leave a steam chamber or space, J, under the pan and behind or within its cone center, the tubular extension passing upwardly through and united with said cone center, and forming the bearing for the driving-shaft substantially as herein described.

5. In an amalgamating-pan, the pan B, having cone center $b$, in combination with the piece, plate, or casting I, as described, and so fitted and secured to the pan as to form a steam chamber or space, J, under the pan and behind or within its cone center, and the steam-ports L L, communicating with said chamber, substantially as herein described.

6. In an amalgamating-pan, the pan B, having the annular ribs $j'\ j^3$ on its bottom in the vertical plane approximately of the outer and inner edge of the dies and shoes, substantially and for the purpose as herein described.

In witness whereof I have hereunto set my hand.

MARTIN P. BOSS.

Witnesses:
C. D. COLE,
J. H. BLOOD.